June 3, 1930.  C. P. DUBBS  1,761,622
PROCESS FOR TREATING PETROLEUM OIL
Original Filed Dec. 21, 1921
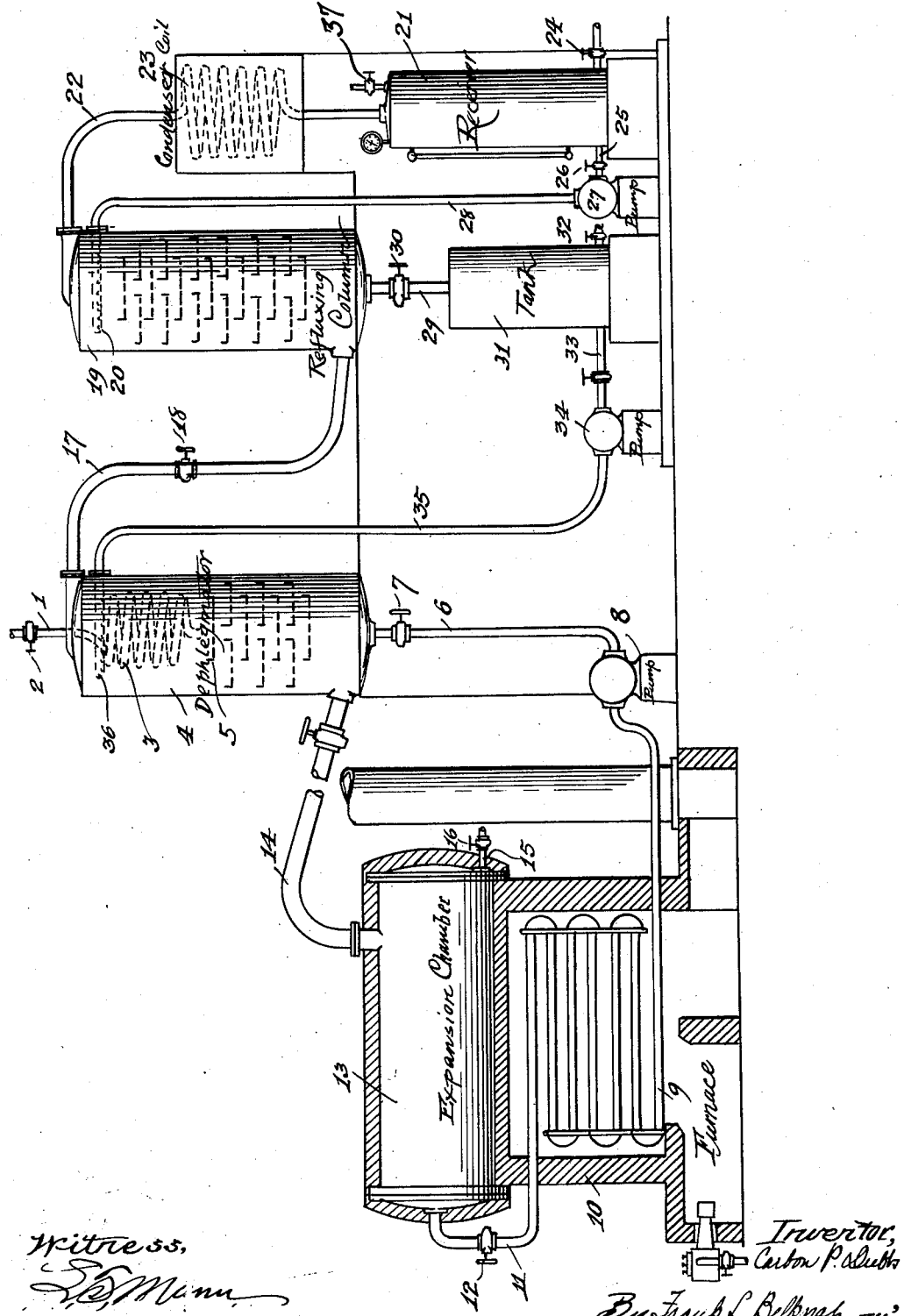

Patented June 3, 1930

1,761,622

UNITED STATES PATENT OFFICE

CARBON P. DUBBS, OF WILMETTE, ILLINOIS, ASSIGNOR TO UNIVERSAL OIL PRODUCTS COMPANY, OF CHICAGO, ILLINOIS, A CORPORATION OF SOUTH DAKOTA

PROCESS FOR TREATING PETROLEUM OIL

Application filed December 21, 1921, Serial No. 523,818. Renewed March 26, 1929.

This invention relates to a process and apparatus for treating petroleum oil and refers more particularly to a process in which the oil is relieved of a greater part of its low boiling point fractions, a separation taking place due to the effect of heat and pressure and the low boiling point distillate collected separately by condensation subsequent to the vaporization of the oil.

The single figure is a diagrammatic side elevation of the apparatus.

Referring to the drawings, the oil to be treated is introduced through the line 1 controlled by a valve 2 passing through the coil 3 mounted within the dephlegmator or reflux column 4. The oil passing from the coil 3 flows out into the pans 5 which are mounted in the lower section of the dephlegmator. Thus the oil in this lower portion passing over the successive pans to the bottom of the dephlegmator comes in intimate contact with the vapors which rise through the column. In the upper section of the dephlegmator the oil vapors circulate about the closed coil, being subjected to the refluxing action of this coil which contains the cool raw oil which is being introduced to the system. The oil with what condensate it may collect in the dephlegmating column, flows down through the draw off line 6 which is regulated by a throttle valve 7 and is charged by means of a pump 8 into the heating tubes 9 which are mounted in a furnace 10. The pump 8 is interposed in the line 6 in order that the velocity of the oil passing through the heating tubes may be accurately controlled. The oil after being raised to a cracking temperature in the furnace, passes through the transfer line 11 controlled by a valve 12 and is permitted to vaporize in the expansion chamber 13 from which evolved vapors pass off through the line 14 while the unvaporized oil containing the free carbon separated out during the conversion reaction, may be drawn off as desired through the residuum line 15 controlled by a valve 16. The vapors passing off through the vapor line 14 pass up through the dephlegmator, being refluxed by coming in contact with the raw oil flowing down over the pans 5 and in the upper section of the dephlegmator by coming in contact with the coil 3 through which flows the incoming cool raw oil. From the top of the dephlegmator is withdrawn the reflux vapors which are passed down through the line 17 regulated by a valve 18. These vapors are introduced to a second refluxing column 19 in which are separated a plurality of perforated pans similar to those mounted in the lower part of the dephlegmator 4. The vapors in this column are further refluxed by coming in contact with pressure distillate which is introduced into the top of the column through the perforated pipe 20. This distillate is drawn from the receiver 21 in which is collected the liquid distillate produced from the vapors passing off through the line 22 and condenser coil 23. The distillate may either be drawn off directly from the receiver through the valve 24 or returned through the line 25 controlled by a valve 26, pump 27 and vertical line 28. This vertical line connects the pump to the perforated circular spray pipe 20 which is positioned in the top of the refluxing column 19. The distillate and what reflux liquid may be separated out in the column 19 is drawn off through the pipe 29 controlled by a valve 30 and is collected in a tank 31 from which it may be drawn off through the valve 32 or directed through the line 33 to a pump 34. This pump in turn charges the distillate back through the line 35 to a second circular perforated spray pipe 36 which is mounted in the top of the initial reflux column 4. Pressure on the system may be accurately regulated by means of the valves interposed between the different stages and also by the pressure relief valve 37 mounted on the receiver 21.

Such an apparatus affords a means for processing oil in a manner in which the final distillate which is collected in the receiver and drawn off through the valve 24 may be of a character conforming with the desires of the operator.

The features of economy combined with the accurate control which may be had over an apparatus of this type, permit the operator to return and rerun his distillate until he has converted it into a product of high quality.

In the first place, due to the introduction of a closed coil into the top of the initial dephlegmator which affords an efficient preheater, there is the added feature of maintaining the raw oil out of contact with the vapors near the top of this column. This is important as with the introduction of raw oil directly into the top of the column, a considerable quantity of low boiling point fractions are immediately relieved from the oil due to the high temperature of the vapors at this point. These fractions are carried over with the vapors and produce a distillate in the receiver which is of an undesirable character. By permitting the oil, however, to come in contact only through radiation with this cool oil in the top of the dephlegmator, but intimately intermingling it in the lower part of the dephlegmator, by which time the raw oil has been preheated and at a point where the vapors are more susceptible of dephlegmation, there is effected a more uniform and even refluxing action than where the oil is introduced directly into the top of the refluxing column.

Another stabilizing effect is the return of the pressure distillate through the line 35 which is sprayed into the top of the column through the spray pipe 36. The introduction of this distillate which is a refractory oil to crack, tends to retard the separation of the lighter fractions from the raw oil, and reduces considerably the distillation taking place during dephlegmation. On passing to the next refluxing column 19, the temperature of dephlegmation is somewhat increased to conform with the final distillate that is required in the receiver. The oil may be rerun in the manner explained until the desired quality of distillate is collected as a final product in the receiver.

Although the disclosure in the drawings is limited to but two stages of dephlegmation, it is understood that the oil vapors may be passed successively through a plurality of stages and in addition to introducing the raw oil to but the initial stage of dephlegmation, it may be introduced into any number of the refluxing stages to produce the desired result. By operating the process under from 100 to 200 pounds pressure and processing mid-continent oil under temperatures in the heating zone of from 700 to 1000 pounds, a high quality distillate of substantial water white color and having a Baumé gravity of from 48 to 52 degrees may be produced as a final distillate.

I claim as my invention:

1. A process for cracking hydrocarbon oil, consisting in heating an advancing stream of oil to a conversion temperature, in delivering the highly heated oil from said stream into an enlarged expansion zone from which no unvaporized oil is permitted to return to said stream, in passing the evolved vapors issuing from said expansion zone to a primary dephlegmator, in delivering the uncondensed vapors from said primary dephlegmator to a secondary dephlegmator, in passing the uncondensed vapors from said secondary dephlegmator to a final condenser, in collecting the resulting distillate, in returning pressure distillate to said secondary dephlegmator to act as a dephlegmating medium for the vapors therein, in returning the reflux condensate separated from the vapors in said secondary dephlegmator to the primary dephlegmator to act as a dephlegmating medium for the vapors undergoing dephlegmation in said primary dephlegmator, and in maintaining a superatmospheric pressure on the oil undergoing conversion.

2. A continuous process for cracking hydrocarbon oil, consisting in heating an advancing stream of oil to a conversion temperature, in delivering the highly heated oil in said stream to an enlarged reaction zone, in passing the evolved vapors from said reaction zone to a primary dephlegmator, in passing the uncondensed vapors from said primary dephlegmator to a secondary dephlegmator, in condensing the vapors issuing from said secondary dephlegmator, in collecting the resulting distillate, in returning predetermined portions of such distillate to said secondary dephlegmator to act as a dephlegmating medium for the vapors therein, in collecting the reflux condensate separated from the vapors in said secondary dephlegmator, and in forcing portions thereof into said primary dephlegmator to come in physical contact with the vapors therein, in continuously introducing charging oil and reflux condensate from said primary dephlegmator to said stream to be raised to a conversion temperature, and in maintaining a self-generated vapor pressure on the oil undergoing treatment.

3. A continuous process for cracking hydrocarbon oil, consisting in subjecting the oil to cracking conditions of temperature and pressure, in passing the evolved vapors to a primary dephlegmating zone, in introducing to such zone to physically commingle with the vapors therein a distillate which has previously undergone a cracking treatment, in aiding the dephlegmation of such vapors in such primary dephlegmating zone by passing charging oil in a heat interchange relation with the vapors therein, in passing the uncondensed vapors from said primary dephlegmating zone to a secondary dephlegmating zone, in condensing the vapors issuing from said secondary dephlegmating zone, in collecting the resulting distillate and returning portions thereof to said secondary dephlegmating zone.

4. An improvement in processes for converting high boiling point oils into lower boiling point oils in which the oil is subjected to a cracking temperature under superatmospheric pressure in a heating coil, thence transferred to an enlarged zone wherein vapors separate from unvaporized liquid oil and the vapors separately removed comprising passing the vapors to a primary partial condenser, thence passing uncondensed vapors to a secondary partial condenser, subjecting vapors issuing from said secondary partial condenser to further cooling, assisting the cooling of said primary partial condenser by passing charging oil for the process therethrough, cooling said secondary partial condenser by introducing thereto a more refractory oil than the charging oil, introducing the charging oil subsequent to passage through said primary partial condenser together with portions of the condensate separated from the vapors to said heating coil.

5. An improvement in a process for converting high boiling oils into lower boiling point oils in which the oil is subjected to a cracking heat under superatmospheric pressure while flowing in a stream through a heating coil and thence delivered to an enlarged zone wherein vapors separate from unvaporized liquid oil and vapors and unvaporized liquid oil separately removed from the enlarged zone comprising subjecting the vapors to successive cooling actions, the first cooling action being effected in physical contact with charging oil for the process, the second cooling action being effected by causing vapors to flow in indirect contact with the charging oil for the process while in physical contact with a lighter oil and the next succeeding cooling action being effected by causing the vapors to pass in countercurrent flow and in physical contact with a still lighter and more refractory oil than those employed in the preceding cooling actions.

CARBON P. DUBBS.